United States Patent [19]
Hishii et al.

[11] Patent Number: 4,606,035
[45] Date of Patent: Aug. 12, 1986

[54] LATERAL EXCITATION TYPE GAS LASER

[75] Inventors: Masao Hishii; Masaaki Tanaka; Yukio Sato; Haruhiko Nagai; Norikazu Tabata, all of Hyogo, Japan

[73] Assignee: Agency of Industrial Science and Technology, Tokyo, Japan

[21] Appl. No.: 592,207

[22] Filed: Mar. 22, 1984

[51] Int. Cl.$^4$ .............................................. H01S 3/097
[52] U.S. Cl. ...................................... 372/87; 372/85; 372/86; 372/55
[58] Field of Search ................................... 372/85-87, 372/55

[56] References Cited

U.S. PATENT DOCUMENTS 4,488,309 12/1984 Tanaka et al. .................. 372/87

FOREIGN PATENT DOCUMENTS

| 0051582 | 3/1983 | Japan | 372/9 |
| 0050786 | 3/1983 | Japan | 372/9 |
| 0046687 | 3/1983 | Japan | 372/59 |
| 0046688 | 3/1983 | Japan | 372/55 |

Primary Examiner—Leon Scott, Jr.
Attorney, Agent, or Firm—Sughrue, Mion, Zinn, Macpeak, and Seas

[57] ABSTRACT

A lateral excitation type gas laser device having a small size and high output. An anode and a cathode are arranged opposite one another with a flow of laser gas therebetween. A high DC voltage is applied between the anode and cathode to cause a glow discharge therebetween. A dielectric electrode is disposed in the flow of laser gas upstream of the anode and cathode, and a high frequency high voltage is applied between the dielectric electrode on one hand and the anode and cathode on the other for causing a silent discharge therebetween. The dielectric electrode has a diameter of $3\text{ mm} < D < d/2$, where D is the diameter of the dielectric electrode and d is the length of the gap between the anode and cathode. The dielectric electrode is disposed in a region defined by $0 \lesssim l_1 \lesssim 2d$ and $0 \lesssim l_2 \lesssim d$, where $l_1$ is the distance in the direction of the laser gas flow between the dielectric electrode and the cathode and $l_2$ is the distance between the dielectric electrode and the anode.

14 Claims, 8 Drawing Figures

LATERAL EXCITATION TYPE GAS LASER

BACKGROUND OF THE INVENTION

The present invention relates to silent-discharge-assisted glow discharge excitation gas laser devices. More particularly, the invention relates to a gas circulation type silent-discharge-assisted glow discharge excitation gas laser device in which preliminary ionization caused by a silent discharge in the flow of laser gas defines operating conditions to obtain a large power density glow discharge of uniform quality.

A high speed gas circulation type high output $CO_2$ laser is disclosed by W. B. Tiffany, R. Targ and J. D. Foster, Appl. Phys. Letters 15, 91 (1969). In the laser structure therein described, a direction of gas flow, a discharge direction for the gas, and the optical axis are mutually orthogonal. This makes the overall size of a device unavoidably quite large.

A further device is described by E. Hoag, H. Pease, J. Staal, and J. Zar, Appl. Optics 13, 1959 (1974). In this laser device, a large discharge volume is required to provide continuous oscillation at a high output level. Further, an electron beam is required for an auxiliary ionizing source. As in the previously discussed case, the overall size of the device is unavoidably large.

Accordingly, it is an object of the present invention to provide a laser device of the above discussed type, but which is significantly reduced in size.

It is a further object of the invention to provide such a laser device having a high output.

SUMMARY OF THE INVENTION

The laser device of the invention has been improved in miniaturization and in the beam mode. Therefore, the laser of the invention is much more suitable as a continuous oscillation type high power laser device (laser output $\geq 1$ KW) used for machining workpieces, for instance, than a conventional laser device.

More specifically, the invention provides a lateral excitation type gas laser device including anode and cathode means arranged opposed to one another, means for providing a flow of laser gas between the anode and cathode means, a high voltage DC source for applying a high DC voltage between the anode and cathode means to cause a glow discharge therebetween, an electrode disposed in the flow path of the laser gas upstream of the anode and cathode means, and a high voltage high frequency source for applying a high frequency high voltage for causing a silent discharge between the dielectric electrode and the anode and cathode means. In accordance with the invention, the dielectric electrode has a diameter defined by: 3 mm $< D <$ d/2, where D is the diameter of the dielectric electrode and d is the length of a gap between the anode and cathode means. Further, the dielectric electrode is disposed in a region defined by: $0 \lesssim l_1 \lesssim 2d$ and $0 \lesssim l_2 \lesssim d$, where $l_1$ is the distance in the direction of the flow of the laser gas between the dielectric electrode and the cathode means, and $l_2$ is the distance between the dielectric electrode and the anode means.

DESCRIPTION OF THE PREFERRED EMBODIMENTS

A preferred embodiment of a silent-discharge-assisted glow discharge excitation $CO_2$ laser device according to the invention will now be described with reference to the accompanying drawings.

Figure 1:
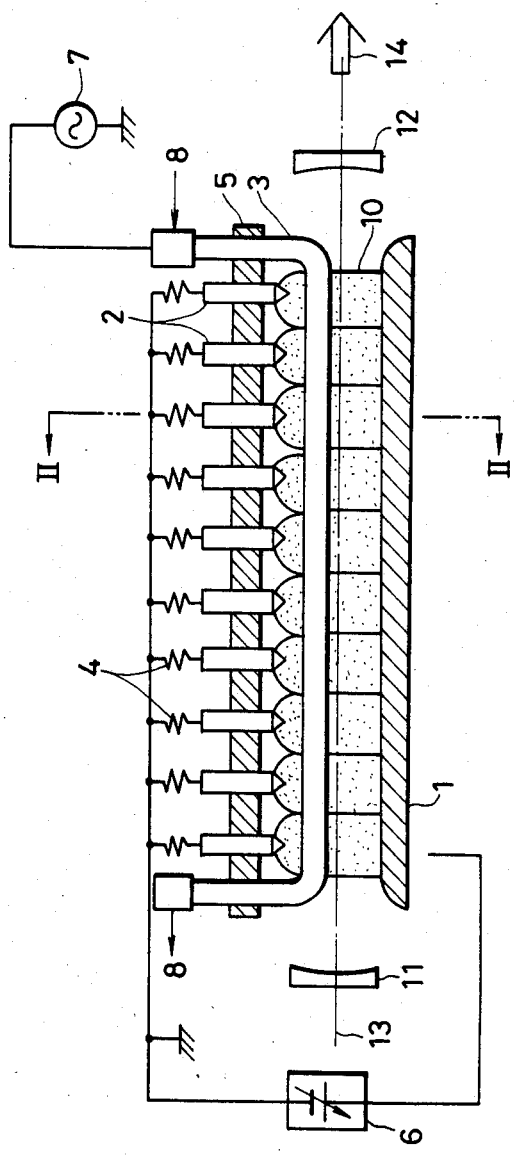
FIG. 1 is a longitudinal cross-sectional view showing a silent-discharge-assisted glow discharge excitation gas laser device of the invention.
Figure 2:
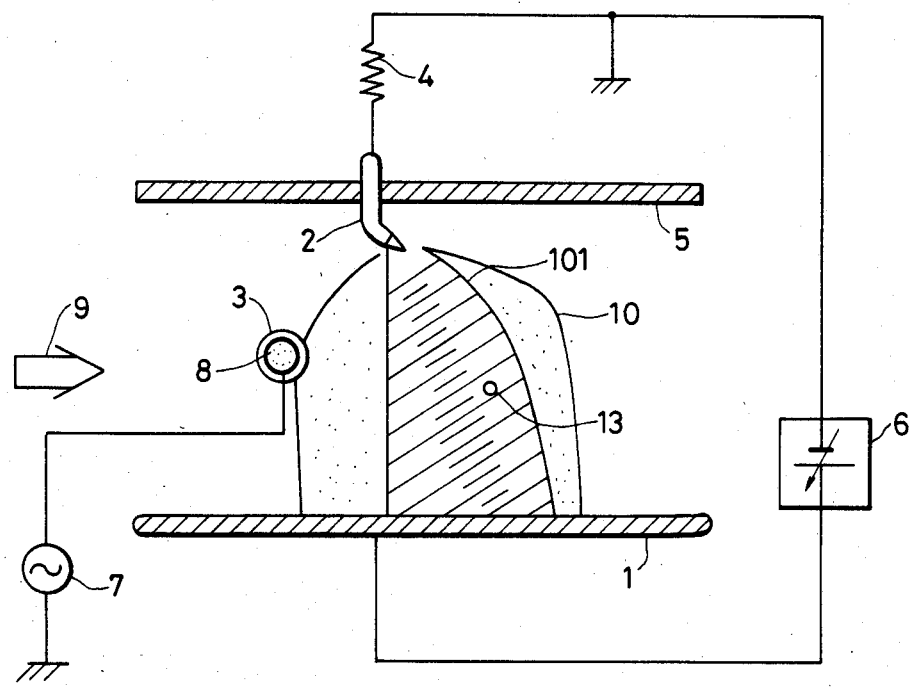
FIG. 2 is a cross-sectional view taken along a line II—II in FIG. 1.

FIG. 1 is a longitudinal cross-sectional view of a preferred embodiment of a laser device of the invention, and FIG. 2 is a cross-sectional view taken along a line II—II in FIG. 1. In these figures, reference numeral 1 designates an anode; 2, cathodes; 3, a dielectric electrode for silent discharge; 4, stabilizing resistors; 5, an insulated cathode substrate; 6, a high voltage DC source for causing a glow discharge, which is the main discharge; 7, a high voltage high frequency source for causing a silent discharge; 8, distilled water for cooling the dielectric electrode; 9, the direction of flow of gas; 10, a section of a silent-discharge-assisted glow discharge excitation medium; 101, a section of the glow discharge excitation medium provided when silent discharge is not present; 11, a totally reflecting mirror; 12, a partially reflecting mirror; 13, a laser axis; and 14, a laser beam.

The operation of the device thus constructed will be described.

The dielectric electrode 3 is disposed upstream of the main discharge gap formed between the anode 1 and the cathodes 2. When the high frequency source 7 applies a high frequency high voltage signal between the dielectric electrode 3 and ground, a silent discharge is caused between the dielectric electrode 3 on one hand and the cathode 2 and anode 1 on the other. The silent discharge preliminarily ionizes a laser gas ($CO_2$-$N_2$-He gas). The laser gas flows in the direction of the arrow 9 into the main discharge gap. When the high voltage DC source 6 applies discharging power between the anode 1 and the cathodes 2 in gas which is preliminarily ionized uniformly in the direction of the laser axis by the silent discharge, a discharge excitation medium of uniform quality and high power density is formed. A resonator formed by arranging the total reflecting mirror and the partially reflecting mirror with the discharge excitation medium therebetween. Laser oscillation is thereby caused to emit the laser beam 14 through the partially reflecting mirror 12.

In order to cause the $CO_2$ laser to oscillate continuously, it is essential to maintain the temperature of gas at the discharge excitation section 10 low. Accordingly, as shown in FIGS. 1 and 2, a number of cathodes 2 are arranged in the direction of the laser axis, and the laser gas is caused to flow in the direction of the arrow 9 (in the direction of the flow 9) at a circulation speed of higher than 10 m/sec. To accomplish this, the cathodes, the dielectric electrode and the resonator are housed in a closed container, and the laser gas is circulated in the container.

The dielectric electrode 3 may be an iron pipe of circular cross section which is lined with glass, or a glass pipe on the inside of which thin metal wires are laid for application of the high frequency signal. The inside of the dielectric electrode 3 is cooled by the distilled water 8. The electrode 1 may be a flat plate-shaped metal electrode made of copper. The cathodes 2 are split-type electrodes extending perpendicular to the direction of the laser axis 13, and located at intervals of about 10 mm. The cathodes 2 are made of molybdenum or tungsten and have sharp ends.

Before various conditions for obtaining the preliminary ionization effect of the silent discharge are described, the general specifications of the laser in FIGS. 1 and 2 will be described.

The main discharge gap length (the distance between the anode 1 and the cathode group 2) is 75 mm, and the discharge length is 1 m. The number of cathodes is 100, and each stabilizing resistor has a resistance of 30 K$\Omega$. The dielectric electrode 3 has a diameter of 7 to 30 mm, and its glass wall thickness is about 1 mm. The frequency of the output of the high voltage high frequency source is 1 KHz to 1 MHz, and the voltage is 3 to 10 KV. The laser gas is a mixture of $CO_2$, $CO$, $N_2$ and $He$. The gas pressure is 30 to 300 Torr, and the flow rate of gas is 20 to 100 m/sec.

Figure 3:
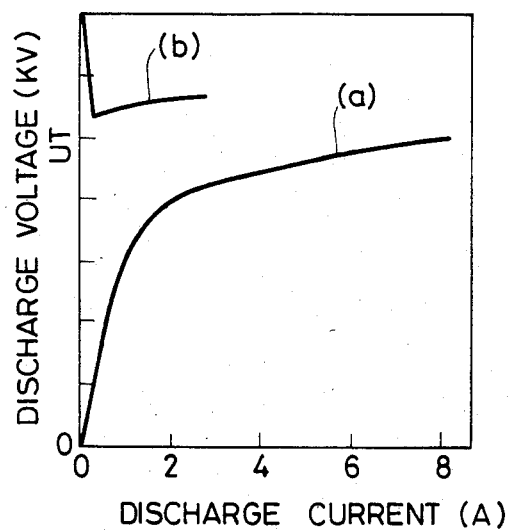
FIG. 3 is a graphical representation indicating the voltage-current characteristic of a glow discharge.

FIG. 3 shows a typical silent-discharge-assisted glow discharge characteristic curve (a) and an ordinary glow discharge characteristic curve (b). The difference between the two discharge characteristic curves is attributed to whether or not a silent discharge is carried out. The two discharges are the same with respect to other operating conditions. The main standard discharge conditions are as follows: the dielectric electrode diameter is 12 mm, the frequency of the high frequency source is 10 KHz, the gas pressure is 100 Torr., and the gas flow rate is 40 m/sec. As is apparent from FIG. 3, due to the preliminary ionization effect of the silent discharge, the discharge voltage is greatly decreased and the maximum applied power is increased by a factor of about three. As shown in FIG. 2, the section 10 of the medium provided when silent discharge is performed is larger than that 101 (shaded region in FIG. 2) provided when silent discharge is not carried out. In order to obtain a significant preliminary ionization effect of the silent discharge as described above, it is necessary to suitably select the arrangement of the dielectric electrode 3, the diameter of the dielectric electrode 3, the power and the frequency for the silent discharge, and also the gas pressure and the gas flow rate.

Figure 4:
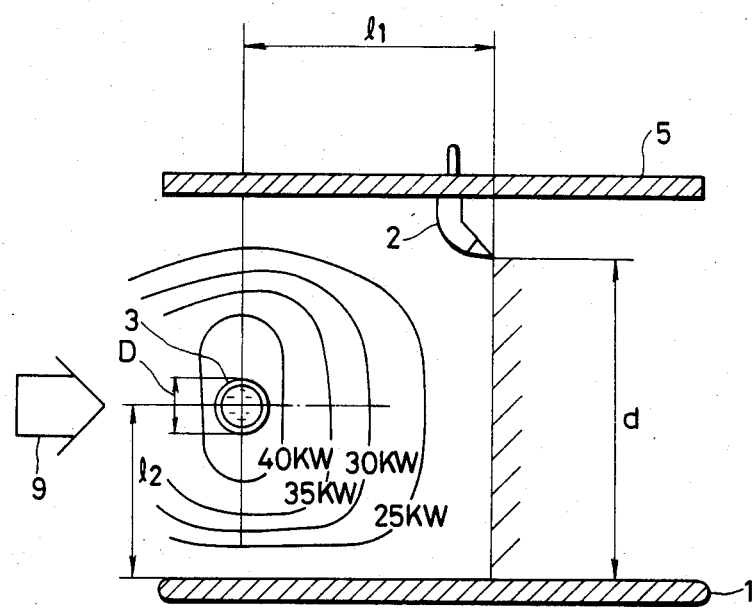
FIG. 4 is an explanatory diagram for a description of the relationship between a dielectric electrode position and a maximum glow discharge power.

FIG. 4 shows the relationships between the position of the dielectric electrode 3 and the maximum glow discharge power obtainable. In FIG. 4, reference character d designates the discharge gap length, $l_1$ is the distance in the direction of the flow of gas between the dielectric electrode 3 and the cathodes 2, and $l_2$ is the distance between the anode 1 and the dielectric electrode 3. In FIG. 4, contours of maximum glow discharge powers with d=75 mm are drawn. A maximum power 40 KW is obtained in a region defined by ranges of 40 mm$\lesssim l_1 \lesssim$60 mm and 25 mm$\lesssim l_2 \lesssim$60 mm. The position of the region depends on the gap length d and the gas flow rate. In general, the optimum distance $l_1$ decreases as the gap length d decreases, and the optimum distance $l_2$ decreases substantially in proportion to the decrease of the gap length d. In addition, as the gas flow speed increases, the optimum distance $l_1$ increases.

Figure 5:
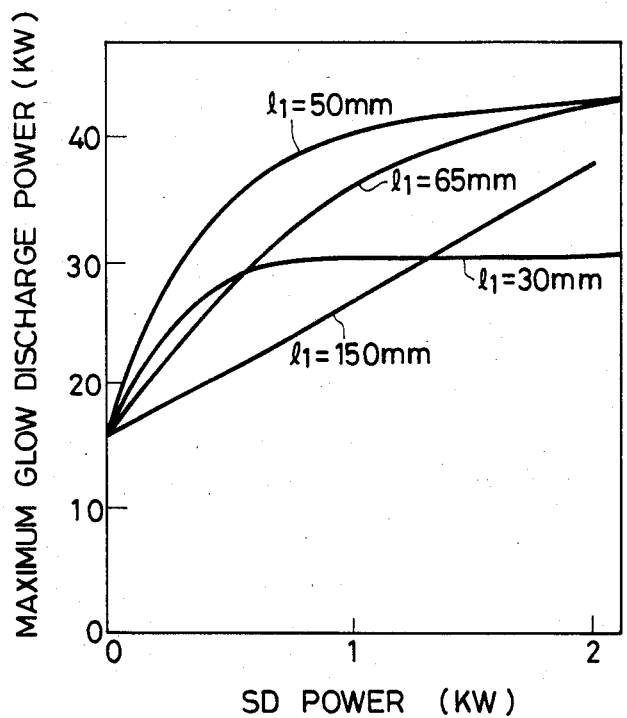
FIG. 5 is a characteristic diagram showing variations of a discharge characteristic depending on the position, in the direction of the flow of gas, of the dielectric electrode.

FIG. 5 is a characteristic diagram showing the relations between maximum glow discharge powers and silent discharge powers with $l_1$ as a parameter and with $l_2$=50 mm. As is clear from FIG. 5, in the case where the distance $l_1$ is made long (65 mm), in order to obtain the same preliminary ionization effect as that in the case of $l_1$=50 mm, the silent discharge power must be larger. In the case where $l_1$=150 mm, that is, in the case of 2d, in order to apply a discharge power of 40 KW, the silent discharge power must be more than twice that in the case of $l_1$=50 mm. This is not practical.

According to experiments, it has been found that the dielectric electrode 3 should be positioned in substantially in the range of 0$\lesssim l_1 \lesssim$2d and 0$\lesssim l_2 \lesssim$d. That is, when the distance $l_1$ and $l_2$ are selected as described above, the preliminary ionization effect of the silent discharge can be obtained effectively. In the case where the dielectric electrode 3 is positioned on the side (shaded in FIG. 4) downstream of the cathode 2 in FIG. 4, the maximum glow discharge power greatly decreases in comparison with that in the case where the dielectric electrode is not used. That is, in this case, the silent discharge adversely affects the flow discharge.

Next, the relationships between the diameter D of the dielectric electrode 3 and the maximum glow discharge power will be described. If the diameter D is made substantially equal to the gap length d, the flow of gas is greatly disturbed by the presence of the dielectric electrode, and hence the maximum glow discharge power is decreased. On the other hand, as the diameter D decreases, the electrode surface area is decreased, that is, the capacitance is decreased, as a result of which it is difficult to apply the silent discharge power. In practice, with 3 mm$\lesssim D \lesssim$d/2, the preliminary ionization action of the silent discharge can be effectively obtained.

Figure 6:
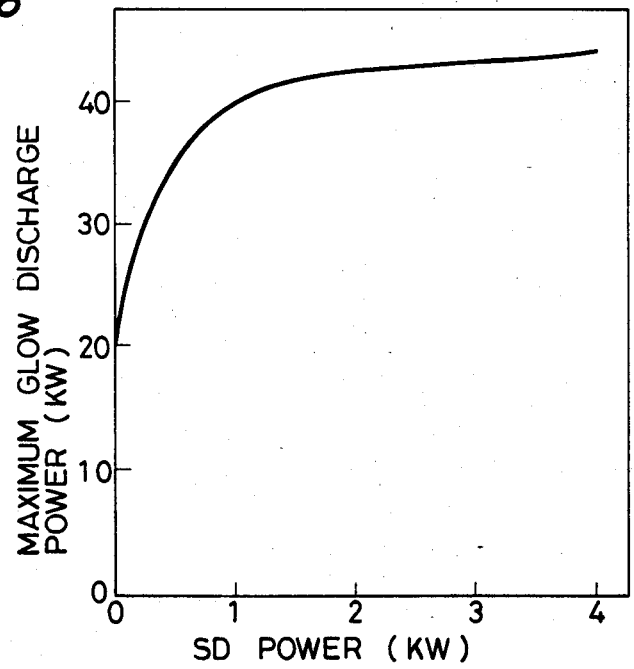
FIG. 6 is a characteristic diagram showing the relationship between a maximum glow discharge power and a silent discharge power.

FIG. 6 is a characteristic diagram showing the variation of the maximum glow discharge power with the silent discharge power with $l_1$=$l_2$=50 mm. The maximum glow discharge power increases with the silent discharge power. As is apparent from FIG. 6, when the silent discharge power is only a few percent of the glow discharge power, the preliminary ionization effect is significant, and, in practice, a silent discharge power of less than 10% will suffice.

The silent discharge power W is generally defined by the following relation:

$$W \alpha F(v) \cdot f \cdot c$$

where F(v) is the positive function of the zero peak value v, f is the frequency of the power source, and c is the capacitance of the dielectric electrode.

In an experiment, the parameters v, f and c governing the silent discharge power W were varied to determine empirically the relationship between the maximum glow discharge power and the silent discharge power. As a result, it was found that all measurement points were arranged on the characteristic curve of $l_1$=50 mm in FIG. 5. That is, the preliminary ionization effect of the silent discharge is determined by the silent discharge power only. In these measurements, the frequency f was varied in a range of from 1 KHz to 1 MHz.

Figure 7:
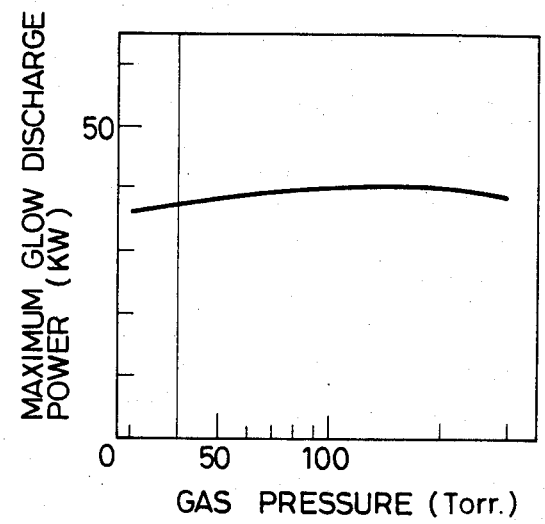
FIG. 7 is a characteristic diagram showing the relationship between a minimum glow discharge power and a gas pressure.

FIG. 7 shows the gas pressure dependency of the maximum glow discharge power in the case where a silent discharge is employed. As is apparent from FIG. 7, the maximum glow discharge power is substantially constant when the gas pressure is in the range of 30 to 300 Torr. The gas used was a mixture of $CO_2$, CO, $N_2$ and He in respective proportions of 2:1:6:32.

Figure 8:
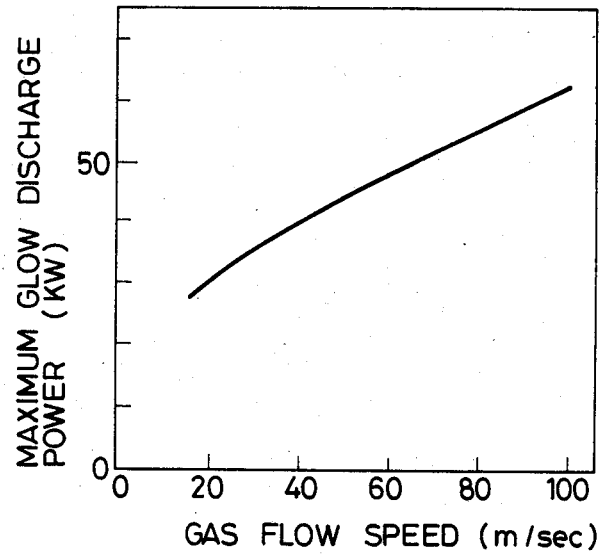
FIG. 8 is a characteristic diagram showing the relationship between a maximum glow discharge power and a gas flow speed.

FIG. 8 shows the gas flow speed dependency of the maximum glow discharge power. In the gas flow speed range of 20 to 100 m/sec, the maximum glow discharge power increases monotonically. This is not due to the fact that the preliminary ionization effect of the silent discharge increases with the gas flow speed, but is due to the fact that the maximum applied power of the glow discharge without the silent discharge increases with the gas flow speed.

As described in detail, in order to allow the preliminary ionization of the silent discharge to effectively assist the formation of a glow discharge of large power density and uniform quality, it is essential to suitably select the position of the dielectric electrode, the diameter of the dielectric electrode, the silent discharge power, the silent discharge frequency, the gas pressure and the gas flow speed. That is, if these parameters are suitably set, then the preliminary ionizating effect of the silent discharge becomes significant, and an excitation medium suitable for the laser operation can be obtained readily.

A specific feature of the invention resides in a laser device which includes an anode and cathodes positioned opposed to each other with the flow of laser gas passing between these electrodes. The anode and the cathodes cause a glow discharge upon application of a high DC voltage. A high frequency high voltage is applied to the dielectric electrode to cause a silent discharge between the dielectric electrode and the anode and/or between the dielectric electrode and the cathodes. According to the invention, the diameter D of the dielectric electrode is defined by a relation $3\ mm < D < d/2$, where D is the discharge gap length of the electrodes, and the dielectric electrode is positioned in a region defined by: $0 \lesssim l_1 \lesssim 2d$ and $0 \lesssim l_2 \lesssim d$, where $l_1$ is the distance in the direction of the flow of gas between the dielectric electrode and the cathodes, and $l_2$ is the distance between the dielectric electrode and the anode.

We claim:

1. In a lateral excitation type gas laser device, comprising:
   anode means and cathode means arranged opposed to each other, a gap being formed therebetween;
   means for providing a flow of laser gas between said anode means and cathode means;
   a high voltage DC source for applying a high DC voltage for causing a glow discharge between said anode and cathode means;
   a dielectric electrode disposed in said flow of laser gas upstream of said anode and cathode means in said flow of laser gas; and
   a high voltage high frequency source for applying a high frequency high voltage for causing a silent discharge between said dielectric electrode and said anode and cathode means,
   the improvement wherein said dielectric electrode has a diameter defined by:

$3\ mm < D < d/2$ where D is the diameter of said dielectric electrode and d is the length of the gap between said anode and cathode means,
   and wherein said dielectric electrode is disposed in a region defined by:

$0 \leq l_1 \leq 2d,$ and $0 \leq l_2 \leq d$ where $l_1$ is the distance in the direction of laser gas flow between said dielectric electrode and said cathode means, and $l_2$ is the distance between said dielectric electrode and said anode means.

2. The device as claimed in claim 1, wherein the frequency of said high frequency high voltage applied to said dielectric electrode is in a range of 1 KHz to 1 MHz.

3. The device as claimed in claim 2, wherein a power of a silent discharge caused between said dielectric electrode and said anode and cathode means is 10% or less of that of a laser excitation discharge between said anode and cathode means.

4. The device as claimed in claim 1, wherein said dielectric electrode is in the form of a cylindrical pipe.

5. The device as claimed in claim 4, wherein cooling distilled water flows through said dielectric electrode.

6. The device as claimed in claim 5, wherein said dielectric electrode is an iron pipe lined with glass.

7. The device as claimed in claim 5, wherein said dielectric electrode is a glass pipe on the inside of which a thin metal wire is laid for applying said high frequency high voltage to said dielectric electrode.

8. The device as claimed in claim 1, wherein said cathode means comprises a plurality of split electrodes.

9. The device as claimed in claim 8, wherein said plurality of split electrodes are spaced apart at intervals of about 10 mm.

10. The device as claimed in claim 9, wherein said plurality of split electrodes are connected through respective stabilizing resistors to said high voltage DC source.

11. The device as claimed in claim 1, wherein said laser gas flows at a rate of 20 to 100 m/sec.

12. The device as claimed in claim 1, wherein said laser gas is a mixture of $CO_2$, CO, $N_2$ and He.

13. The device as claimed in claim 1, further comprising a resonator comprising a total reflecting mirror and a partially reflecting mirror arranged opposed to one another with said anode means and said cathode means therebetween.

14. The device as claimed in claim 13, further comprising a closed housing containing said anode means, said cathode means, said dielectric means and said resonator, laser gas being circulated in said housing.

* * * * *